United States Patent [19]

Hirosawa et al.

[11] Patent Number: 4,972,256
[45] Date of Patent: Nov. 20, 1990

[54] METHOD OF ENHANCING IMAGE SHARPNESS FOR IMAGE REPRODUCTION USING SHARP/UNSHARP SIGNAL PROCESSING

[75] Inventors: Makoto Hirosawa; Shinji Asada; Takashi Sakamoto, all of Kyoto, Japan

[73] Assignee: Dainippon Screen Mfg. Co., Ltd., Japan

[21] Appl. No.: 306,659

[22] Filed: Feb. 3, 1989

[30] Foreign Application Priority Data

Feb. 5, 1988 [JP] Japan .................................. 63-23790
Feb. 18, 1988 [JP] Japan .................................. 63-33959

[51] Int. Cl.$^5$ .................................................. H04N 1/46
[52] U.S. Cl. ........................................ 358/80; 358/79; 358/166; 358/447
[58] Field of Search ................... 358/75, 79, 80, 447, 358/166, 37

[56] References Cited

U.S. PATENT DOCUMENTS

| | | | |
|---|---|---|---|
| 4,319,268 | 3/1982 | Yamada | 358/75 |
| 4,591,923 | 5/1986 | Urabe et al. | 358/447 |
| 4,670,793 | 6/1987 | Yamada et al. | 358/447 X |
| 4,734,763 | 3/1988 | Urabe et al. | 358/80 |
| 4,785,347 | 11/1988 | Ezuka et al. | 358/447 X |
| 4,844,288 | 7/1989 | Cho | 358/447 |
| 4,845,550 | 7/1989 | Urabe et al. | 358/80 |
| 4,868,671 | 9/1989 | Murakami | 358/447 |

FOREIGN PATENT DOCUMENTS 2165717 4/1986 United Kingdom ................ 358/447

*Primary Examiner*—James J. Groody
*Assistant Examiner*—Mark R. Powell
*Attorney, Agent, or Firm*—Ostrolenk, Faber, Gerb & Soffen

[57] ABSTRACT

An original image is read with an image reader for each pixel, whereby color component signals (Yi, Mi, Ci, Ki) expressing the original image are obtained. A sharp signal generator extracts the gray component from the combination of the color component signals, to output the gray component as a sharp signal ($S_O$). The difference between the sharp signal ($S_O$) and an unsharp signal (U) is linearly combined with the color component signals, to thereby give sharpness-enhanced signals ($ES_Y$, $ES_M$, $ES_C$, $ES_K$).

17 Claims, 9 Drawing Sheets

METHOD OF ENHANCING IMAGE SHARPNESS FOR IMAGE REPRODUCTION USING SHARP/UNSHARP SIGNAL PROCESSING

BACKGROUND OF THE INVENTION

1. Field of the Invention

The present invention relates to a method of enhancing image sharpness when scanning an imaging plane with a scanning-type image recorder, such as a process color scanner, for use in reproducing an image on the imaging plane.

2. Description of Background Art

The technique of visually enhancing sharpness of an image by amplifying density difference between contours of respective patterns in the image for use in reproducing the image with a process color scanner or the like is well known in the art. In such a conventional technique, an unsharp signal is obtained by taking the weighted average of respective image signals in a plurality of pixels arranged in the form of a matrix. A sharpness enhancement signal is generated from the unsharp signal and an image signal (sharp signal) of a central pixel of the matrix. The sharpness enhancement signal is added to an original image signal. A signal obtained by such addition is supplied to an image recorder as an image signal expressing an image in which sharpness is enhanced.

In the aforementioned technique, degrees of enhancement for respective color component signals of yellow (Y), magenta (M) and cyan (C) are equal to each other. If a part of the color-component signals is saturated in its signal value through enhancement, the following problem is caused:

When the boundary between a white region and a red region on the image is enhanced, for example, a yellow signal and a magenta signal expressing the red region are saturated at a certain saturation level. However, a cyan signal, being below the saturation level, is increased in the boundary, whereby an undesirable black contour appears in the side of the red region.

Thus, according to the prior art, a block contour undesirably appears around a region which has been subjected to contour enhancement. In order to prevent such a problem, there has been proposed a countermeasure of performing no sharpness enhancement with respect to a specific color phase. For example, the technique of disabling sharpness enhancement with respect to red is called a cut-red method. However, since a pattern of the specific color phase is not subjected to sharpness enhancement, apparent quality of a recorded image is lowered when the pattern includes the specific color component as a dominant color component.

Another problem is that, when a color component signal is saturated or enhanced, original image signals are varied in polarity with colors during sharpness enhancement of an original image, lines of different color phases appear on portions subjected to sharpness enhancement. Such a phenomenon is easily caused in a boundary portion between a gray (intermediate color) region and a region of a pure color having high chroma. An unnatural color pseudo-boundary, which is not present in the original, appears on a reproduced image. Thus, it is necessary to suppress the appearance of such a color pseudo-boundary.

SUMMARY OF THE INVENTION

The present invention is intended for a method of enhancing sharpness of a color image. According to the present invention, the method comprises the steps of (a) preparing a color image, (b) separating the color image into color components for each pixel, (c) extracting a gray component from the color components, (d) generating a sharp signal expressing the gray component for each pixel, (e) smoothing the sharp signal in accordance with a predetermined smoothing rule to generate an unsharp signal, (f) calculating a difference between the sharp signal and the unsharp signal, and (g) combining the difference with each of the color components to generate color component signals expressing the color iamge whose sharpness is enhanced.

In an aspect of the present invention, one of the color components is an achromatic color component; the others of the color components are chromatic color components. Under such condition, the step (c) includes the steps of (c-1) comparing the chromatic color components with each other to detect a minimum or maximum component within the chromatic components, (c-2) calculating a linear combination of the minimum or maximum component and the achromatic component, and (c-3) determining the gray component in accordance with the linear combination.

In another aspect of the present invention, the method is so arranged as to comprise the steps of; (a) preparing a color image, (b) separating the color image into color components for each pixel, (c) extracting a gray component from the color components, (d) calculating a weighted linear combination of the color components, (e) combining the gray component with the weighted linear combination to provide a combined value, (f) generating a sharp signal expressing the combined value for each pixel, (g) smoothing the sharp signal in accordance with a predetermined smoothing rule to generate an unsharp signal, (h) calculating a difference between the sharp signal and the unsharp signal, and (i) combining the difference with each of the color components to generate color component signals expressing the color image whose sharpness is enhanced.

In a further another aspect of the present invention, a method of enhancing sharpness of a color image for recording the color image within a predetermined color reproduction range is provided, where the method comprises the steps of; (a) preparing a color image, (b) separating the color image into color components for each pixel, (c) generating a sharp signal on the basis of the color components, the sharp signal expressing the color image for each pixel, (d) generating an unsharp signal expressing the color image for each area larger than the pixel, (e) calculating a difference between the sharp signal and the unsharp signal, (f) multiplying the difference by a predeteremined coefficient to generate an enhancement value, (g) adding the enhancement value to respective ones of the color components in order to generate enhanced signals for respective colors while limitting the enhancement value to a limit level, the limit level being so determined that each of the enhanced signals is not out of the color reproduction range, and (h) outputting the enhanced signals to an image recorder for recording the color image whose sharpness is enhanced.

The present invention is also intended for an image processor suitable for the method mentioned above.

Accordingly, an object of the present invention is to provde a method of enhancing image sharpness, which suppresses appearance of an undesirable black contour and a color pseudo-bondary on a reproduced image.

These and other objects, features, aspects, and advantages of the present invention will become more apparent from the following description of the present invention when taken in conjunction with the accompanying drawings.

DESCRIPTION OF THE PREFERRED EMBODIMENTS

A. Entire Structure and Overall Operation

Figure 1:
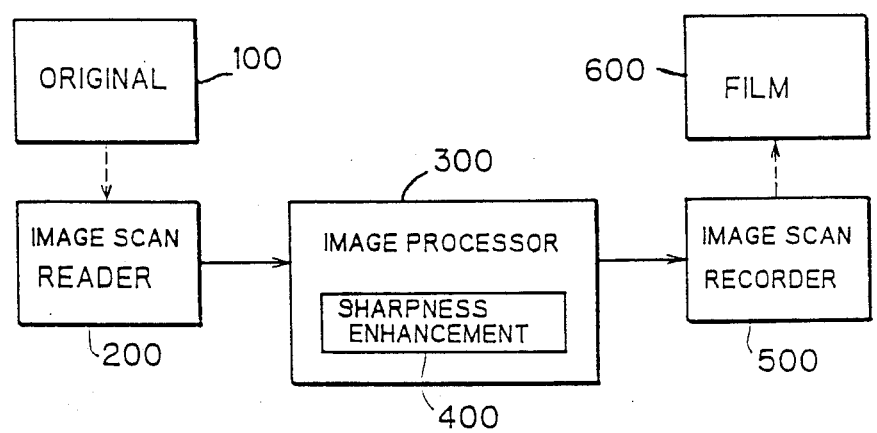
FIG. 1 is a schematic block diagram showing a process color scanner according to a preferred embodiment of the present invention.

FIG. 1 is a schematic block diagram showing a process color scanner according to an embodiment of the present invention. In FIG. 1 an image of an original 100 is read for each pixel by an image scan reader 200, and an image signal thus obtained is transferred to an image processor 300. The image processor 300 comprises a sharpness-enhancement circuit 400 having a function as hereinafter described, to perform processing such as sharpness enhancement of the image expressed by the inputted image signal. Upon such processing, the image signal is supplied to an image scan recorder 500. The image scan recorder 500 converts the image signal into a halftone-dot signal, to modulate laser beams on the basis of the same. A photosensitive film 600 is scanned by the laser beams, whereby a halftone-dot image is recorded on the photosensitive films 600.

B. Procedure

B-1. First Processing

Processing according to first structure of the present invention is conducted as follows:

It is assumed that the input values with respect to i-th pixels of image signals for four color overprinting are expressed as Yi (yellow), Mi (magneta), Ci (cyan) and Ki (black). A gray component Gi is obtained by these input values through the expression:

$$Gi = a_1 \times [Min(Yi, Mi, Ci)] + a_2 \times Ki \quad (1)$$

where $a_1$ and $a_2$ are constants and Min(Yi, Mi, Ci) represents the minimum value within Yi, Mi and Ci.

The above expression (1) is applied when the input values Yi, Mi, Ci and Ki are those for positives. If the input values are those for negatives, the following expression (2) is applied:

$$Gi = a_1 \times [Max(Yi, Mi, Ci)] + a_2 \times Ki \quad (2)$$

where Max(Yi, Mi, Ci) represents the maximum value within Yi, Mi and Ci.

In the method according to the present invention, the gray component signal Gi found by the expression (1) or (2) is employed as a sharp signal $S_0$. While the following description is directed to processing for a positive image, those skilled in the art will find apparent from the following description a similar procedure for processing a negative image.

First, the aforementioned sharp signal $S_0$ and an unsharp signal U are formed; the proecss of forming the unsharp signal U being described later. An enhancement factor $(S_0 - U)$ is formed by these two signals. Through use of a coefficient k for deciding the degree of enhancement and a color component signal Q(=Y, M, C or K) for each color block, an enhanced signal ES is provided for each color component as follows:

$$ES = Q + k \times (S_0 - U) \quad (3)$$

Referring to the expression (3), an enhancement signal $k(S_0 - U)$ is so formed from the sharp signal $S_0$, i.e., the gray component Gi, as to be common to the respective color blocks, whereby independent saturation of color component signals caused by sharpness enhancement is suppressed and enhancement signals for the respective color blocks are equalized to each other in polarity. Thus prevented is the appearance of an undesirable black contour and pseudo-boundary between different color regions.

On the other hand, it may be required to reproduce an image while enhancing or relaxing sharpness with respect to a specific color region. In this case, a sharp signal $S_0$ is provided as follows:

$$\begin{aligned}S_0 &= Gi + a_3 \times (b_1 Yi + b_2 \times Mi + b_3 \times Ci) \\ &= a_1 \times [Min(Yi, Mi, Ci)] + a_2 \times Ki + \\ &\quad a_3 \times (b_1 \times Yi + b_2 \times Mi + b_3 \times Ci)\end{aligned} \quad (4)$$

where $a_1, a_2, a_3, b_1, b_3$ represent constants.

Within the coefficients $b_1$ through $b_3$, that for the color whose sharpness should be relatively enhanced is set at a relatively large value, while that for the other color is set at a relatively small value. The value of the coefficient $a_3$ is determined according to the desired degree of the unhomogeneous enhancement. In ohter words, the sharpness of a certain color can be enhanced through the selection of the coefficient values $b_1$–$b_3$ and $a_3$.

Figure 2:
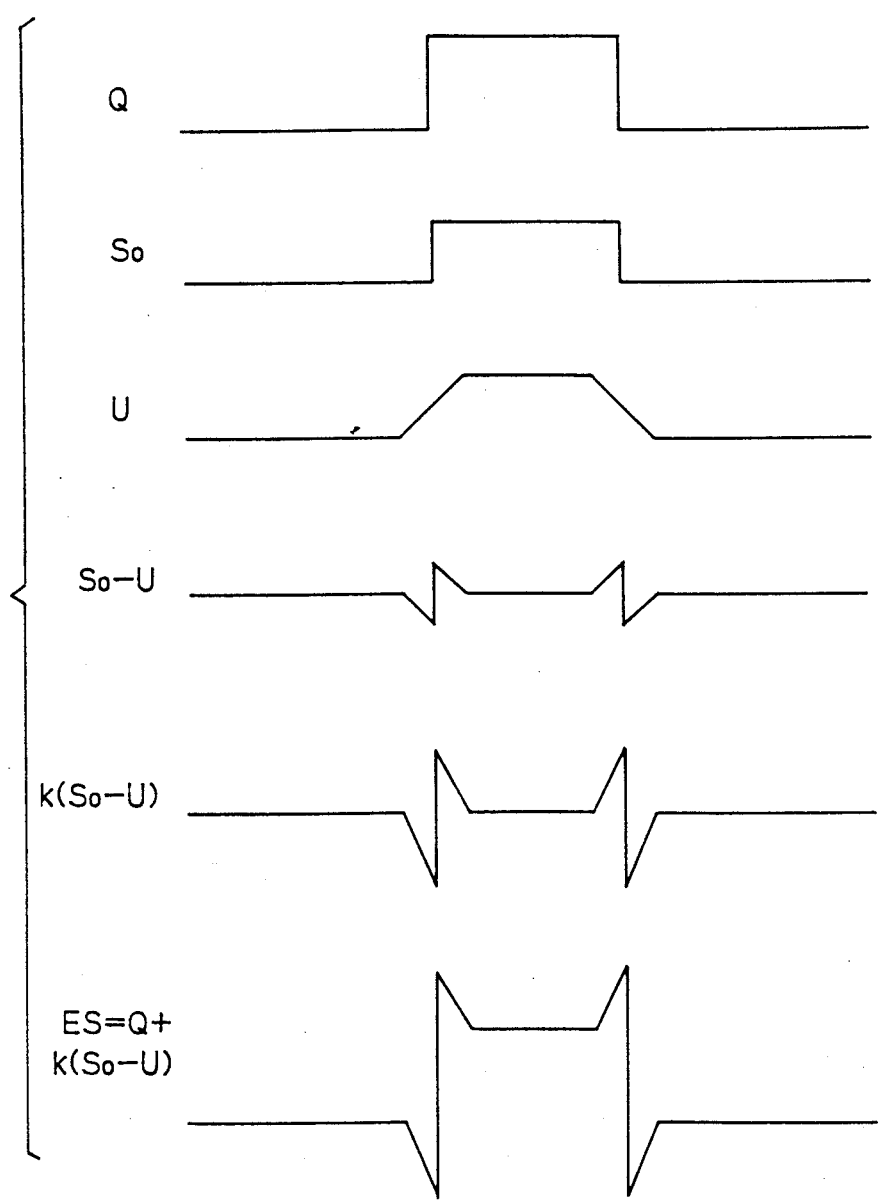
FIG. 2 is a graph showing waveforms in respective stages of sharpness enhancement employing a sharp signal obtained from a gray component.

FIG. 2 is a graph showing waveforms in respective stages of sharpness enhancement employing the aforementioned sharp signal $S_0$. A color component signal Q for an arbitrary color block is shown in the uppermost section. The sharp signal $S_0$ is formed on the basis of a gray component. An unsharp signal U is formed from the sharp signal $S_0$. An enhancement factor $(S_0 - U)$ is formed by these two signals, and an enhancement signal $k(S_0 - U)$ indicating the degree of enhancement by its polarity and level is formed by converting the enhancement factor $(S_0-U)$ through a conversion table.

The coefficient k expresses the ratio of the output level to the input level defined on the conversion table prepared in the form of a look-up table. The value of the coefficient k is previously determined for designating the degree of the sharpness enhancement, and it is a constant common to every input level or a parameter variable for each input level. An enhanced signal $ES=Q+k(S_0-U)$ is shown in the lowermost section. Enhanced signals for other color blocks are identical in polarity to the signal shown in FIG. 2, while amplitudes thereof are not saturated. Thus suppressed is appearance of a color pseudo-boundary between different color regions and an undesired black contour.

B-2. Second Processing

Next, processing according to another embodiment of the present invention will be described with reference to FIGS. 3A and 3B.

Figure 3A:
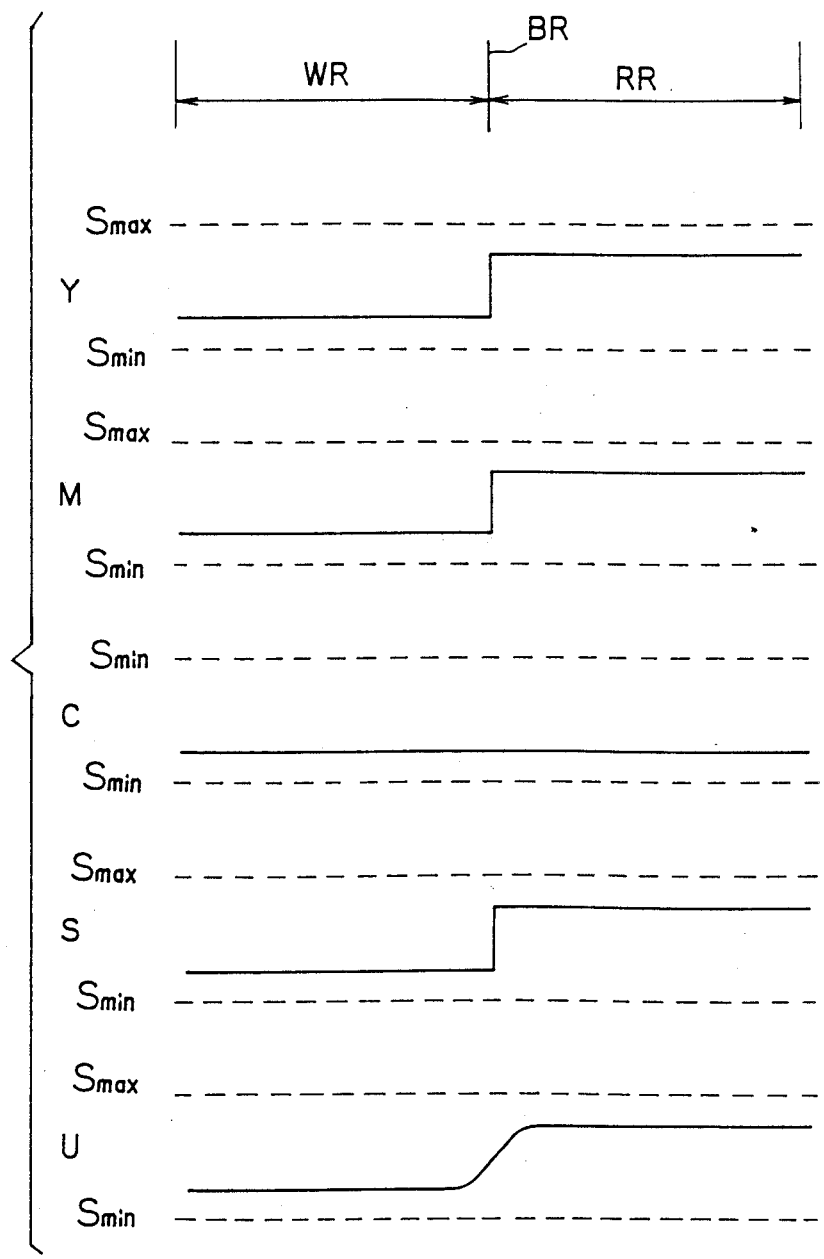
FIGS. 3A and 3B are graphs showing waveforms in respective stages of sharpness enhancement employing an enhancement signal obtained through a limiter.

FIG. 3A is a graph showing waveforms of color component signals Y (yellow), M (magenta) and C (cyan) in a white region WR, an intermediate red region RR and a boundary BR; with waveforms of a sharp signal S and an unsharp signal U formed from these signals. Broken lines show possible maximum values $S_{max}$ and minimum values $S_{min}$ of these signals.

In the white region WR, all of the color component signals Y, M and C are at low levels. At the boundary BR, levels of the color component signals Y and M are increased, while the color component signal C is retained at the low level. In the red region RR, the color component signals Y and M are retained at high levels, and the color component signal C is retained at the low level.

The sharp signal S is provided by the maximum one of the color component signals Y, M and C (S=Max[Y, M, C]). The unshapr signal U is obtained by smoothing the sharp signal S with a prescribed smoothing width. The waveform of the unsharp signal is loosely changed across the boundary BR.

Figure 3B:
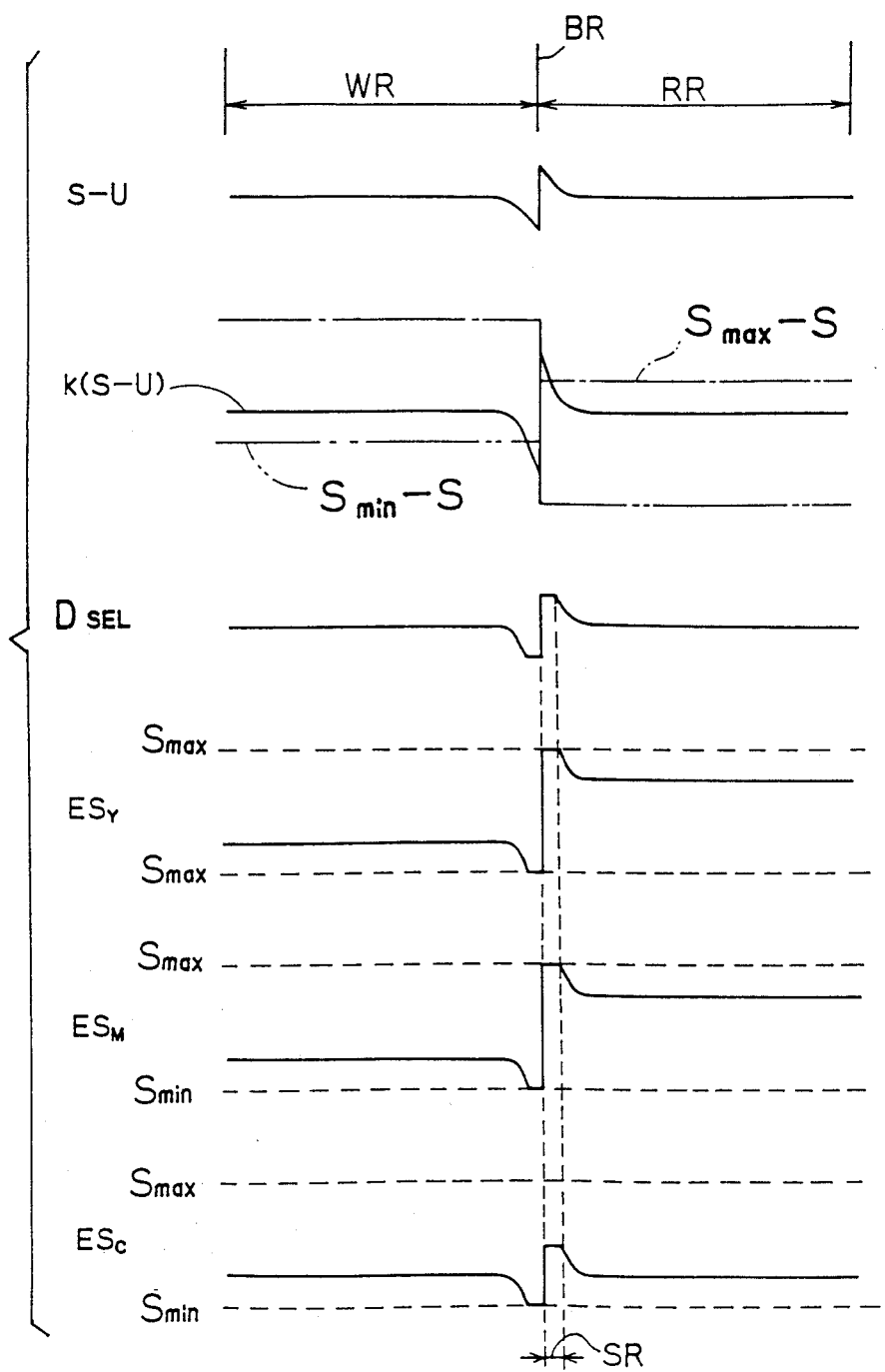

FIG. 3B is a graph showing waveforms of signals obtained from those shown in FIG. 3A. A difference signal (S−U) is shown in the uppermost section. The difference signal (S−U) has different polarity levels across the boundary BR. In the second section, a solid line shows a signal k(S−U) obtained by multiplying the difference signal (S−U) by a prescribed coefficient k; a one-dot chain line shows a difference signal $(S_{max}-S)$ between the maximum value $S_{max}$ and the sharp signal S; and a two-dot chain line shows a difference signal $(S_{min}-S)$ between the minimum value $S_{min}$ and the sharp signal S.

An enhancement signal $D_{SEL}$ is provided in accord with the following rules:

(1) A smaller one of the signal k(S−U) and the difference signal $(S_{max}-S)$ is selected to obtain a signal $D_{MIN}$, as follows:

$$D_{MIN}=Min[k(S-U), (S_{max}-S)]$$

(2) Then, a larger one of the signal $D_{MIN}$ and the difference signal $(S_{max}-S)$ is selected as the enhancement signal $D_{SEL}$:

$$D_{SEL}=Max[D_{MIN}, (S_{min}-S)]$$

The enhancement signal $D_{SEL}$ thus obtained is added to the respective color component signals Y, M and C shown in FIG. 3A, thereby to form enhanced signals $ES_Y$, $ES_M$ and $ES_C$ for corresponding color blocks.

Each one of the enhanced signals $ES_Y$ and $ES_M$ is at the maximum value $S_{max}$ in an interval SR, and hence these signals $ES_Y$ and $ES_M$ are saturated. In the interval SR, the level of the enhanced signal $ES_C$ is clamped or limited at a specific level. Therefore, the enhanced signals $ES_Y$, $ES_M$ and $ES_C$ are balanced, to suppress appearance of an undesired black contour. When this technique is applied to the boundary between a gray region and a region of a bright color, appearance of a color pseudo-boundary is suppressed in a similar manner.

C. Circuit Structure

Figure 4:
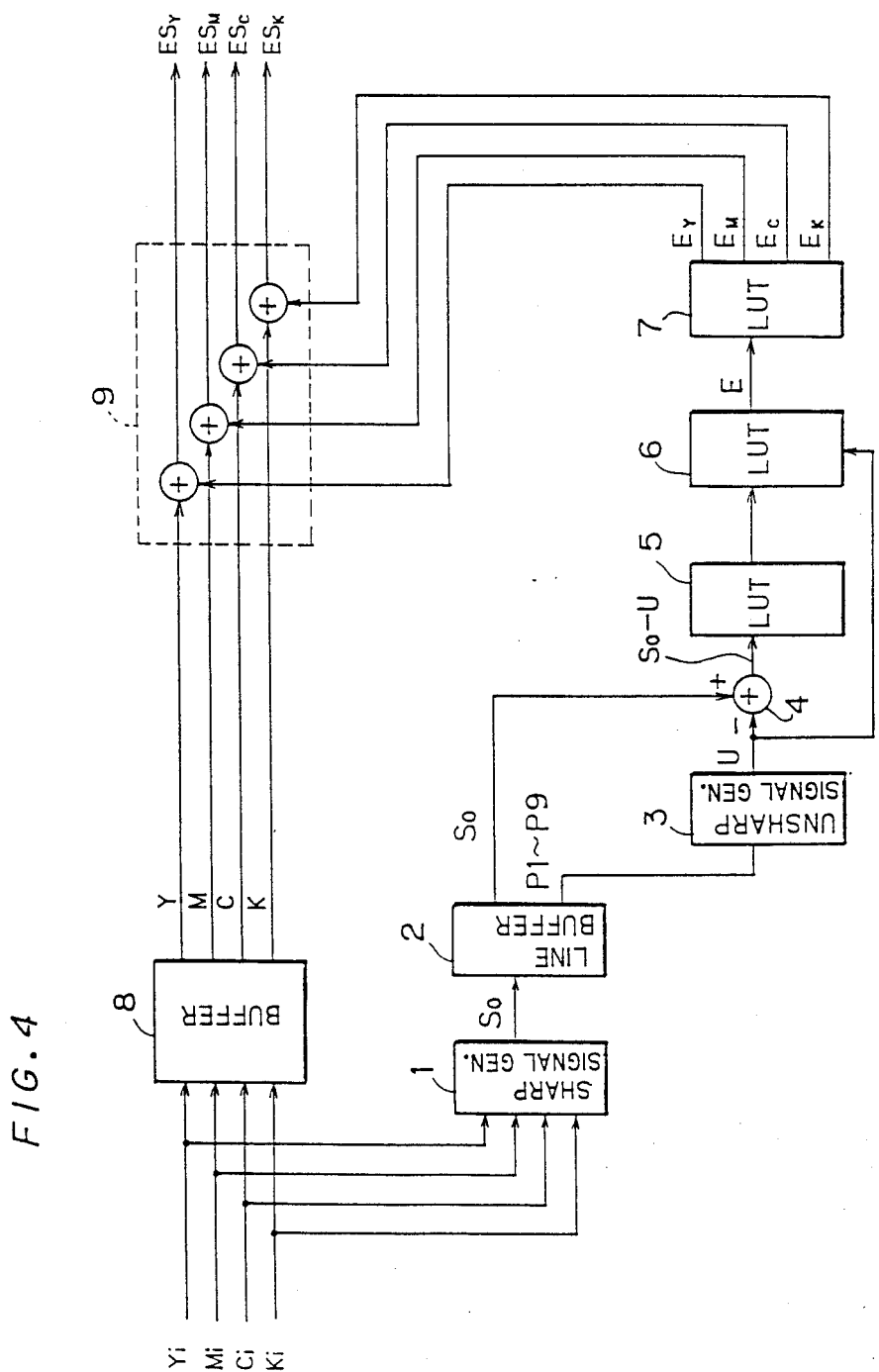
FIG. 4 is a block diagram showing a sharpness-enhancement circuit which is operable to generate a sharp signal on the basis of a gray component.

FIG. 4 is a block diagram showing a sharpness enhancement circuit corresponding to the method of obtaining the sharp signal $S_0$ from the gray component as described above in item B-1 ("First Processing").

The color original 100 (FIG. 1) is read by the image scan reader 200 sequentially along scanning lines. The color component signals Yi, Mi, Ci and Ki thus obtained for each pixel, as indicated in FIG. 4 are inputted to a sharp-signal generating circuit 1. In the circuit 1, the above-noted expression (1) is applied to these signals, thereby to generate the sharp signal $S_0$. Structure and operation of this circuit will be hereinafter described.

The sharp signal $S_0$ is inputted to a line buffer 2. On the basis of the sharp signal $S_0$ inputted along an image-reading sequence, the line buffer 2 generates sharp signals P1 to P9 with respect to all of pixels belonging to a pixel arrangement in a 3 by 3 matrix.

Figure 5:
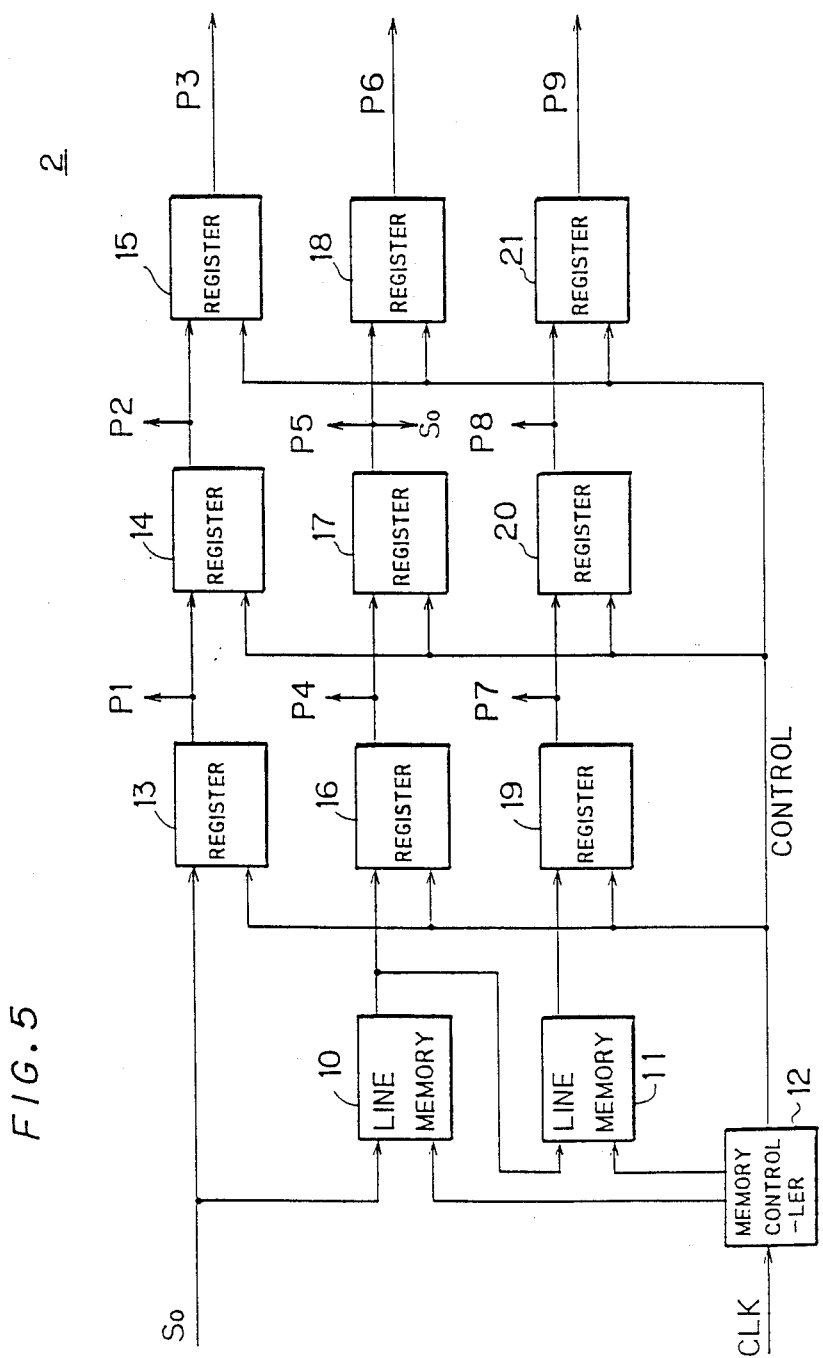
FIG. 5 is a block diagram showing internal structure of a line buffer.

FIG. 5 is a block diagram showing an exemplary structure of the line buffer 2. Each of line memories 10 and 11 has storage capacity for the sharp signal $S_0$ for one scanning line. These line memories 10 and 11 respectively store the sharp signal $S_0$ for a pair of adjacent scanning lines in response to a command from a memory controller 12, which is controlled by clock pulses CLK supplied from a clock generator (not shown).

The sharp signal $S_0$ is sequentially inputted in three registers 13, 14 and 15, which are arranged in series with each other, to be sequentially latched pixel by pixel. The sharp signal $S_0$ ≠ *is also sequentially inputted in the line memories 10 and 11.*

A group of three registers 16, 17 and 18 and another group of three registers 19, 20 and 21 are provided at the respective rear stages of the line memories 10 and 11, where the registers 13, 16 and 19 (14, 17 and 20; 15, 18 and 21) are arranged in parallel with each other. The register groups 16 to 18 and 19 to 21 are adapted to sequentially latch the sharp signal $S_0$ read from the line memories 10 and 11 pixel by pixel by a command from memory controller 12. Through such structure, the nine registers 13 to 21 output the sharp signals P1 to P9 with respect to the respective pixels arranged in the 3 by 3 (=9) matrix.

The sharp signal P5 of the central pixel within the nine pixels is outputted also as the sharp signal $S_0$ having passed through the line buffer 2 (FIG. 4). The sharp signals P1 to P9 of the nine pixels are inputted in parallel to a subsequent unsharp-signal generating circuit 3, in which the weighted average of the sharp signals P1 to P9 is obtained thereby to generate the unsharp signal U.

The sharp signal $S_0$ is inputted to a positive input terminal of an adder 4. The unsharp signal U is inputted to a negative input terminal. The adder 4 substantially serves as a subtracter, thereby to output a difference signal ($S_0-U$).

The difference signal ($S_0-U$) is sequentially inputted in two look-up table memories (LUT) 5 and 6, which are arranged in series with each other. The LUT 5 converts the level of the difference signal ($S_0-U$) with reference to its polarity. The LUT 6 receives the unsharp signal U, to convert the level of output from the LUT 5 with reference to that of the unsharp signal U. The combination of the LUTs 5 and 6 may be replaced by a single look-up table.

An enhancement factor E thus obtained is inputted in another LUT 7. The LUT 7 multiplies the enhancement factor E by a coefficient, which is previously set for each color block. Assuming that $k_Y$, $k_M$, $k_C$ and $k_K$ represent the coefficients corresponding to the color blocks of yellow, magenta, cyan and black respectively, enhancement signals $E_Y$, $E_M$, $E_C$ and $E_K$ corresponding to the color blocks of yellow, magenta, cyan and black outputted from the LUT 7 are expressed as follows:

$$\left.\begin{array}{l} E_Y = k_Y \times E \\ E_M = k_M \times E \\ E_C = k_C \times E \\ E_K = k_K \times E \end{array}\right\} \quad (5)$$

These signals $E_Y$, $E_M$, $E_C$ and $E_K$ are supplied to an adder 9.

The color-component signals Yi, Mi, Ci and Ki are also applied to a timing correction buffer 8 (FIG. 4), to be delayed in such buffer 8 by periods required for forming the aforementioned enhancement factors $E_Y$, $E_M$, $E_C$ and $E_K$. The delayed color-component signals are supplied from the buffer 8 to an adder 9 as color-component signals Y, M, C and K. The adder 9 adds the color signals Y, M, C and K to the enhancement factors $E_Y$, $E_M$, $E_C$ and $E_K$ for each color component. Thus, obtained are enhanced signals $ES_Y$, $ES_M$, $ES_C$ and $ES_K$ corresponding to the respective color blocks of yellow, magenta, cyan and black.

Figure 6:
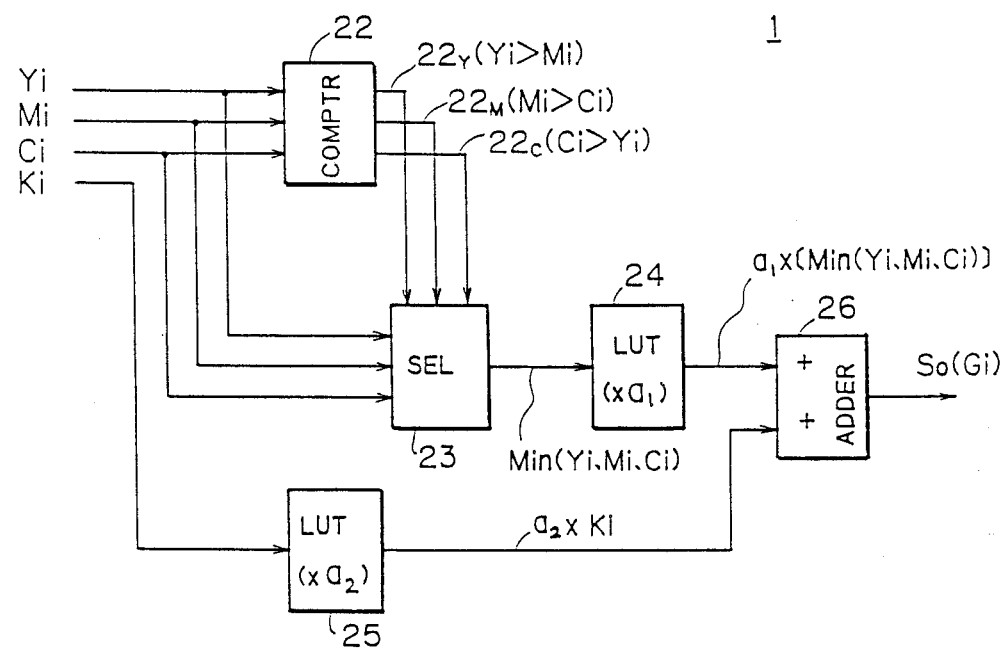
FIG. 6 is a block diagram showing an example of a sharp-signal generating circuit.

FIG. 6 is a block diagram showing exemplary structure of the aforementioned sharp signal generating circuit 1 shown in FIG. 4. This circuit 1 generates the sharp signal $S_0$ on the basis of the aforementioned expression (1).

Referring to FIG. 6, color-component signals Yi, Mi and Ci are inputted in a comparator 22 and a selector 23. The comparator 22 compares the respective levels of the three input signals Yi, Mi and Ci with each other, to generate signals 22Y, 22M and 22C, which are activated when Yi>Mi, Mi>Ci and Ci>Yi respectively. The three output signals 22Y, 22M and 22C are supplied to the selector 23. The selector 23 selects the minimum value Min(Yi, Mi, Ci) of the input signals Yi, Mi and Ci in accord with the rule shown in the following Table 1, to output the same.

TABLE 1

| 22Y (Yi > Mi) | 22M (Mi > Ci) | 22C (Ci > Yi) | Min (Yi,Mi,Ci) |
| --- | --- | --- | --- |
| 0 | 0 | 1 | Yi |
| 0 | 1 | 0 | Ci |
| 0 | 1 | 1 | Yi |
| 1 | 0 | 0 | Mi |
| 1 | 0 | 1 | Mi |
| 1 | 1 | 0 | Ci |
| 1 | 1 | 1 | (error) |

TABLE 1-continued

| 22Y (Yi > Mi) | 22M (Mi > Ci) | 22C (Ci > Yi) | Min (Yi,Mi,Ci) |
| --- | --- | --- | --- |
| 0 | 0 | 0 | Yi (= Mi,Ci) |

Thus, the minimum value Min(Yi, Mi, Ci) is inputted to an LUT 24 to be multiplied by a coefficient $a_1$, to thereby generate a signal $a_1 \times [\text{Min}(Yi, Mi, Ci)]$.

On the other hand, a black component signal Ki is inputted in an LUT 25 to be multiplied by a coefficient $a_2$, to thereby generate a signal $a_2 \times Ki$. The signal $a_1 \times [\text{Min}(Yi, Mi, Ci)]$ is added to the signal $a_2 \times Ki$ in an adder 26, whereby the sharp signal $S_0$ is generated as follows:

$$S_0 = Gi = a_1 \times [Min(Yi, Mi, Ci)] + a_2 \times Ki$$

Figure 7:
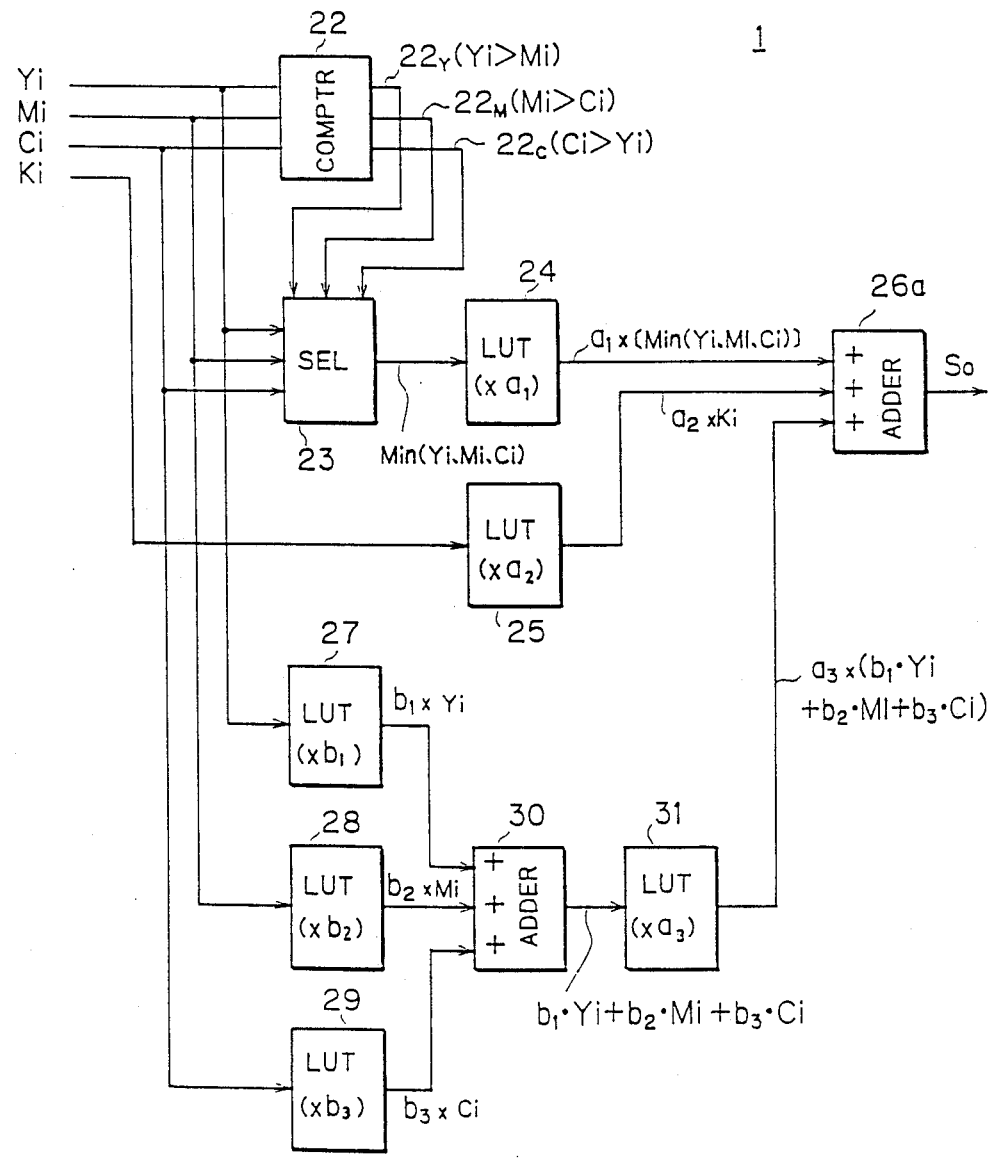
FIG. 7 is a block diagram showing another example of a sharp-signal generating circuit.

FIG. 7 is a block diagram showing another exemplary structure of the sharp-signal generating circuit 1. This circuit generates a sharp signal $S_0$ on the basis of the above-noted expression (4). Structure and operation of a comparator 22, a selector 23 and LUTs 24 and 25 are similar to those shown in FIG. 6. Color component signals Yi, Mi and Ci are inputted to LUTs 27, 28 and 29, respectively, to be multiplied by coefficients $b_1$, $b_2$ and $b_3$. Respective outputs $b_1 \times Yi$, $b_2 \times Mi$ and $b_3 \times Ci$ of the LUTs 27, 28 and 29 are added together in an adder 30, to thereby generate a signal ($b_1Yi + b_2Mi + b_3Ci$). The signal ($b_1Yi + b_2Mi + b_3Ci$) is further multiplied by a coefficient $a_3$ in an LUT 31, whereby a signal $a_3 \times (b_1Yi + b_2Mi + b_3Ci)$ is inputted to an adder 26a. The adder 26a adds together the signal $a_1 \times [\text{Min}(Yi, Mi, Ci)]$ from the LUT 24, the signal $a_2 \times Ki$ from the LUT 25 and the signal $a_3 \times (b_1Yi + b_2Mi + b_3Ci)$ from the LUT 23, to generate the following sharp signal:

$$S_0 = a_1 \times [Min(Yi, Mi, Ci)] + a_2 \times Ki + a_3 \times (b_1 \times Yi + b_2 \times Mi + b_3 \times Ci)$$

The sharp signal $S_0$ obtained in accord with the above noted expression (4), as well as that obtained in accord with the above noted expression (1), includes a gray signal Gi.

Figure 8:
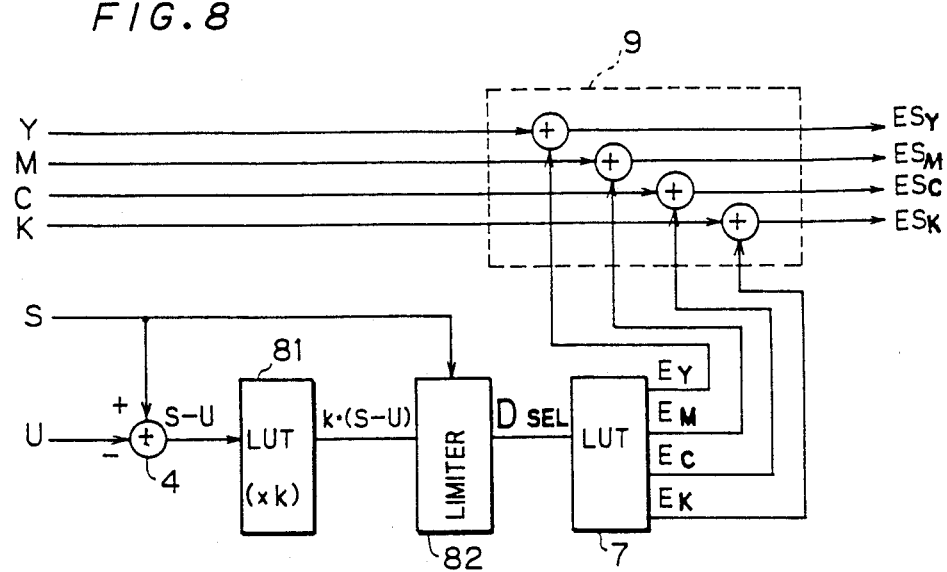
FIG. 8 is a block diagram showing a sharpness-enhancement circuit which is operable to generate an enhancement signal through a limiter.

FIG. 8 is a block diagram showing a sharpness-enhancement circuit employing the enhancement factor $D_{SEL}$ as described above in item B-2 ("Second Processing"). Color component signals Y, M, C and K are inputted in parallel to an adder 9. In an operation circuit (not shown) provided in the sharpness-enhancement circuit 400, the maximum signal Max(Y, M, C) of the color-component signals Y, M and C is selected as a sharp signal S, and a signal obtained by smoothing the sharp signal S with prescribed smoothing width is formed as an unsharp signal U. The sharp signal S is applied to a positive input terminal of an adder 4, and the unsharp signal U is inputted in a negative input terminal. The adder 4 generates a difference signal (S−U), to supply the same to an LUT 81. The LUT 81 multiplies the difference signal (S−U) by a coefficient k to generate a signal $k \times (S-U)$, and supplies the same to a limiter 82.

Figure 9:
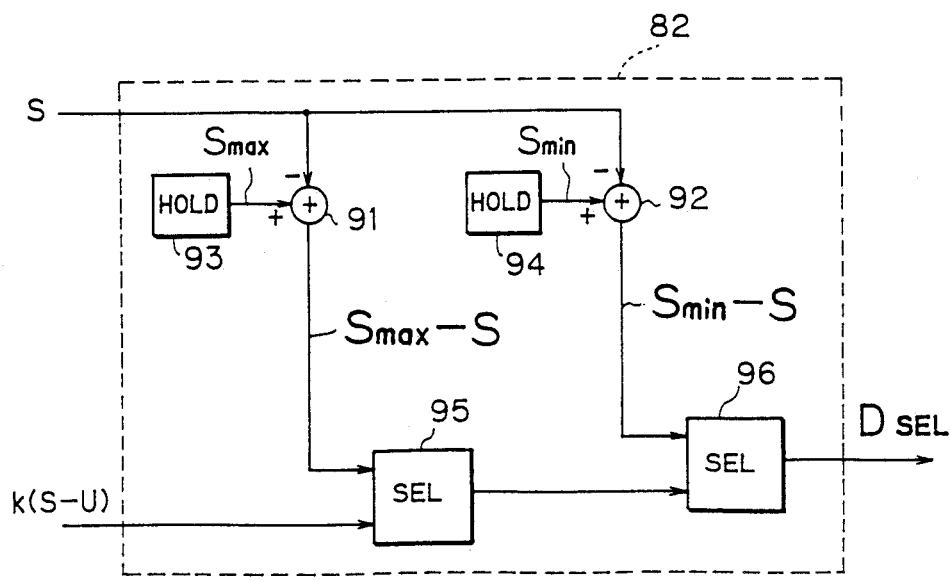
FIG. 9 is a block diagram showing internal structure of the limiter of FIG. 8.

FIG. 9 is a block diagram showing the structure of the limiter 82. The limiter 82 receives the sharp signal S and the signal k (S−U). The sharp signal S is inputted to respective negative input terminals of adders 91 and 92. A maximum value $S_{max}$ previously set in a maximum value-holding circuit 93 is inputted to a positive input terminal of the adder 91, and a minimum value $S_{min}$ previously set in a minimum value-holding circuit 94 is inputted to a positive input terminal of an adder 92. The adder 91 outputs a signal ($S_{max}-S$), while the adder 92 outputs a signal ($S_{min}-S$). A selector 95 compares the signal ($S_{max}-S$) with the signal k (S−U), to select and output a smaller one. Another selector 96 compares the signal ($S_{min}-S$) with an output from the selector 95, to select and output a larger one.

The finally output obtained $D_{SEL}$ provides the enhancement factor "$D_{SEL}$" shown in FIG. 3B. In the circuit shown in FIG. 8, the enhancement factor $D_{SEL}$ is multiplied by a coefficient which is previously set for each color block in an LUT 7. Enhancement factors $E_Y$, $E_M$, $E_C$ and $E_K$ for the respective color blocks outputted from the LUT 7 are added to corresponding color-component signals Y, M, C and K in the adder 9, respectively. Consequently, the adder 9 outputs enhanced signals $ES_Y$, $ES_M$, $ES_C$ and $ES_K$ corresponding to the respective color blocks of yellow, magenta, cyan and black.

D. Modification

While processing is performed on the respective color-component signals of yellow, magenta, cyan and black in the aforementioned embodiments, similar processing can be performed on primary color-component signals, i.e., color signals of red (R), green (G) and blue (B). For example, a sharp signal $S_0'$ based on a gray component is provided as follows:

$$S_0' = a_1 \times [Min(R, G, B)] + a_2 \times (b_1 \times R + b_2 \times G + b_3 \times B) \quad (6)$$

A circuit for generating this sharp signal $S_0'$ receives color-component signals R, G and B in place of the inputs Yi, Mi and Ci of the circuit shown in FIG. 7. The LUT 25 is omitted. The circuit shown in FIG. 7 is thus modified to perform similar processing.

Although the present invention has been described and illustrated in detail, it is clearly understood that the same is by way of illustration and example only and is not to be taken by way of limitation; the spirit and scope of the present invention being limited only by the terms of the appended claims.

We claim:

1. A method of enhancing sharpness of a color image, comprising the steps of:
   (a) reading a color image,
   (b) separating said color image into color components for each pixel,
   (c) extracting a gray component from said color components,
   (d) generating a sharp signal expressing said gray component for each pixel,
   (e) averaging said sharp signal for neighboring pixels to generate an unsharp pixel signal,
   (f) calculating a difference between said sharp signal and said unsharp pixel signal, and
   (g) combining said difference with each of said color components to generate color-component signals expressing said color image whose sharpness is enhanced.

2. A method in accordance with claim 1, wherein:
   one of said color components is an achromatic color component,
   the others of said color components are chromatic color components, and
   said step (c) includes the steps of;
   (c-1) comparing said chromatic color components with each other to detect a minimum or maximum component within said chromatic components,
   (c-2) calculating a linear combination of said minimum or maximum component and said achromatic component, and
   (c-3) determining said gray component in accordance with said linear combination.

3. A method in accordance with claim 2, wherein the step (g) includes the steps of:
   (g-1) multiplying said difference by predetermined coefficients individually to generate products,
   (g-2) adding said products to said color components, respectively, to generate sums, and
   (g-3) generating said color component signals as signals expressing said sums, respectively.

4. A method of enhancing sharpness of a color image, comprising the steps of:
   (a) reading a color image,
   (b) separating said color image into color components for each pixel,
   (c) extracting a gray component from said color components,
   (d) calculating a weighted linear combination of said color components,
   (e) combining said gray component with said weighted linear combination to provide a combined value,
   (f) generating a sharp signal expressing said combined value for each pixel,
   (g) averaging said sharp signal for neighboring pixels to generate an unsharp pixel signal,
   (h) calculating a difference between said sharp signal and said unsharp pixel signal, and
   (i) combining said difference with each of said color components to generate color-component signals expressing said color image whose sharpness is enhanced.

5. A method in accordance with claim 4, wherein one of said color components is an achromatic color component,
   the others of said color components are chromatic color components, and
   said step (c) includes the steps of;
   (c-1) comparing said chromatic color components with each other to detect a minimum or maximum component within said chromatic components,
   (c-2) calculating a linear combination of said minimum or maximum component and said achromatic component, and
   (c-3) determining said gray component in accordance with said linear combination.

6. A method in accordance with claim 5, wherein: said weighted linear combination is a weighted linear combination of said chromatic color components.

7. A method of enhancing the sharpness of a color image for recording said color image within a predetermined color reproduction range, said method comprising the steps of:
   (a) reading a color image,
   (b) separating said color image into color components for each pixel,
   (c) generating a sharp signal on the basis of said color components, said sharp signal expressing said color image for each pixel,
   (d) generating an unsharp signal expressing said color image for each area larger than said pixel, (e) calculating a difference between said sharp signal and said unsharp signal, (f) multiplying said difference by a predetermined coefficient to generate an enhancement value, (g) adding said enhancement value to respective ones of said color components in order to generate enhanced signals for respective colors while limiting said enhancement value to a limit level, said limit level being so determined that each of said enhanced signals is not our of said color reproduction range, and (h) outputting said enhanced signals to an image recorder for recording said color image whose sharpness is enhanced, and wherein the step (c) includes the steps of:

(c-1) extracting a maximum component from said color components, and (c-2) generating said sharp signal in accordance with said maximum component, and wherein the step (g) includes the steps of:

(g-1) subtracting said sharp signal from a first signal expressing an upper limit of said color reproduction range to generate a first subtracted value, (g-2) comparing said enhancement value with said first subtracted value to specify a smaller one of said enhancement value and said first subtracted value, and (g-3) limiting said enhancement value to said smaller one.

8. A method in accordance with claim 7, wherein the step (g) further includes the steps of;

(g-4) subtracting said sharp signal from a second signal expressing a lower limit of said color reproduction range to generate a second subtracted value, (g-5) comparing said second subtracted value with said smaller one to specify a larger one of said second subtracted value and said smaller one, and (g-6) further limitting said enhancement value to said larger one.

9. An image processor for enhancing sharpness of a color image, comprising:

(a) an image reader for reading a color original image to separate said color original image into color components for each pixel, (b) means for extracting a gray component from said color components, (c) means for generating a sharp signal for each pixel in accordance with said gray components, (d) means for averaging said sharp signal for neighboring pixels to generate an unsharp signal, (e) means for calculating a difference between said sharp signal and said unsharp signal, and (f) means for calculating respective linear combination of said difference and said color components to generate enhanced signals expressing said color original image whose sharpness is enhanced.

10. An image processor in accordance with claim 9, wherein said means (c) includes;

(c-1) means for calculating a weighted linear combination of said color components, (c-2) means for adding said weighted linear combination to said gray component, to generate said sharp signal.

11. An image processor for enhancing sharpness of a color image, comprising;

(a) means for reading a color original image to separate said color original image into color components for each pixel, (b) means for generating a sharp signal for each pixel in accordance with said color components, (c) means for generating an unsharp signal expressing said color original image for each area larger than said pixel, (d) means for generating a first enhancement signal expressing a product of a constant value and a difference between said sharp signal and said unsharp signal, (e) limitter means for limiting said first enhancement signal in accordance with said sharp signal, to generate a second enhancement signal, and (f) means for adding said second enhancement signal to said color components individually, to generate enhanced signals expressing said color original image whose sharpness is enhanced.

12. An image processor in accordance with claim 11, wherein:

said image processor further comprises;

(g) holding means for holding first and second values expressing upper and lower limits of a predetermined color density range, respectively, and said limitter means includes;

(e-1) means for subtracting said sharp signal from a first limit signal expressing said first value to generate a first subtracted signal, said first limit signal being delivered from said holding means, (e-2) means for subtracting said sharp signal from a second limit signal expressing said second value to generate a second subtracted signal, said second limit signal being delivered from said holding means, and (e-3) means for limiting said first enhancement signal within a range between said first and second subtracted signals to generate said second enhancement signal.

13. An image processor in accordance with claim 12, wherein said means (e-3) includes:

(e-3-1) means for selecting a smaller one of said first enhancement signal and said first subtracted signal, to generate a first selected signal expressing said smaller one, and (e-3-2) means for selecting a larger one of said first selected signal and said second subtracted signal, to generate a second selected signal expressing said larger one, said second enhancement signal being said second selected signal.

14. An apparatus in accordance with claim 9, wherein said apparatus is used for sharpness enhancement of a color image for positive image reproduction, and said color image is expressed by chromatic color components and an achromatic color component, said means (b) including;

(b-1) means for comparing said chromatic color components with each other to extract a minimum component from said chromatic color components, (b-2) means for multiplying said minimum component by a first constant to generate a first value, (b-3) means for multiplying said achromatic component by a second constant to generate a second value, and (b-4) means for adding said first value to said second value, to generate said gray component.

15. An apparatus in accordance with claim 9, wherein said apparatus is used for sharpness enhancement of a color image for negative image reproduction, and said color image is expressed by chromatic color components and an achromatic color component, said means (b) including;
- (b-1) means for comparing said chromatic color components with each other to extract a maximum component from said chromatic color components,
- (b-2) means for multiplying said maximum component by a first constant to generate a first value,
- (b-3) means for multiplying said achromatic component by a second constant to generate a second value, and
- (b-4) means for adding said first value to said second value, to generate said gray component.

16. An apparatus in accordance with claim 10, wherein said apparatus is used for sharpness enhancement of a color image for positive image reproduction, and said color image is expressed by chromatic color components and an achromatic color component, said means (b) including;
- (b-1) means for comparing said chromatic color components with each other to extract a minimum component from said chromatic color components,
- (b-2) means for multiplying said minimum component by a first constant to generate a first value,
- (b-3) means for multiplying said achromatic component by a second constant to generate a second value, and
- (b-4) means for adding said first value: and said second value to generate said gray component.

17. An apparatus in accordance with claim 10, wherein said apparatus is used for sharpness enhancement of a color image for negative image reproduction, and said color image is expressed by chromatic color components and an achromatic color component, said means (b) including;
- (b-1) means for comparing said chromatic color components with each other to extract a maximum component from said chromatic color components,
- (b-2) means for multiplying said maximum component by a first constant to generate a first value,
- (b-3) means for multiplying said achromatic component by a second constant to generate a second value, and
- (b-4) means for adding said first value, and said second value to generate said gray component.

* * * * *